UNITED STATES PATENT OFFICE.

NICHOLAS LANSER, OF ALLEGHENY, PENNSYLVANIA.

FILTERING MATERIAL.

SPECIFICATION forming part of Letters Patent No. 656,552, dated August 21, 1900.

Application filed March 6, 1900. Serial No. 7,585. (No specimens.)

*To all whom it may concern:*

Be it known that I, NICHOLAS LANSER, a citizen of the United States of America, residing at Allegheny, in the county of Allegheny and State of Pennsylvania, have invented certain new and useful Improvements in Filtering Material, of which the following is a specification.

This invention relates to certain new and useful improvements in filtering material and method of manufacturing the same.

The invention aims to produce a filtering material which shall embody all the properties of natural stone used for filtering purposes, and at the same time be as efficient in its use, and, furthermore, comparatively inexpensive to manufacture.

Briefly described the invention consists of a filtering material consisting of mineral wool obtained from the refuse obtained during the manufacture of steel and iron, washing the mineral wool in boiling water for removing all its impurities, removing the water therefrom, solidifying the mass in a porous manner, thus forming what I term "mineral felt," adding thereto, if desirable, fifteen to twenty-five per cent. of clay, and then baking the same.

The invention finally consists in the novel method for producing a filtering material, which shall be hereinafter more specifically described, and particularly pointed out in the claims.

The filtering material is prepared in the following manner: I take a suitable quantity of mineral wool, which is a refuse obtained in the manufacture of steel and iron, and wash the same in boiling water until all the impurities are removed. The wool is then pressed, forcing the water therefrom, thus solidifying the wool in a porous manner, which product I term "mineral felt." The wool when solidified may be of any desirable thickness for different pressures of water when the same is used alone for filtering purposes. After the wool has been solidified I add thereto fifteen to twenty-five per cent. of clay and then suitably bake the same, forming thereby a porous mass, which I term "filtering-stone."

As heretofore stated, a filtering material constructed of the ingredients and in the manner as herein set forth possesses all the properties contained in a natural filtering-stone, and, furthermore, can be manufactured at a comparatively-small cost.

It is thought that the many advantages of my improved filtering material, as well as the simplicity in manufacturing the same, can be readily understood from the foregoing description.

Having thus fully described my invention, what I claim as new, and desire to secure by Letters Patent, is—

1. As a new article of manufacture, a filtering material consisting of mineral felt and clay.

2. As a new article of manufacture, a filtering material consisting of mineral wool solidified in a porous manner, and a suitable quantity of clay added thereto.

3. The herein-described method of manufacturing a filtering material consisting of first taking a quantity of mineral wool and boiling the impurities therefrom, second solidifying the same in a porous manner and removing the water therefrom, third suitably adding thereto a quantity of clay, and fourth baking the said clay and mineral wool.

4. The herein-described method of manufacturing a filtering material consisting in first taking a quantity of mineral wool and removing the impurities therefrom, second solidifying the same in a porous manner, third adding thereto a quantity of clay, and fourth baking the said clay and wool.

5. The herein-described method of manufacturing a filtering material consisting in first taking a quantity of mineral wool and removing the impurities therefrom, second solidifying the same in a porous manner, third adding thereto fifteen to twenty-five per cent. of clay, and fourth baking the said clay and wool.

In testimony whereof I affix my signature in the presence of two witnesses.

NICHOLAS LANSER.

Witnesses:
JOHN NOLAND,
J. P. BROWNLEE.